United States Patent
Morgan

(10) Patent No.: US 7,999,734 B2
(45) Date of Patent: Aug. 16, 2011

(54) APPARATUS HAVING INTEGRATED RADIO AND GPS RECEIVERS

(75) Inventor: Patrick N. Morgan, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 0 days.

(21) Appl. No.: 11/729,717

(22) Filed: Mar. 29, 2007

(65) Prior Publication Data
US 2008/0238766 A1 Oct. 2, 2008

(51) Int. Cl.
*G01S 19/35* (2010.01)
(52) U.S. Cl. .................................. 342/357.75
(58) Field of Classification Search . 342/357.01–357.17
See application file for complete search history.

(56) References Cited

U.S. PATENT DOCUMENTS

| | | | | |
|---|---|---|---|---|
| 5,663,735 | A | * | 9/1997 | Eshenbach ............... 342/357.15 |
| 6,778,135 | B2 | | 8/2004 | Warloe et al. ............ 342/357.12 |
| 6,809,775 | B2 | * | 10/2004 | Yule .............................. 348/553 |
| 6,879,028 | B2 | * | 4/2005 | Gerber et al. ................ 257/676 |
| 7,076,256 | B1 | * | 7/2006 | Orler et al. ................ 455/456.1 |
| 2006/0036365 | A1 | * | 2/2006 | Chiayee et al. ............... 701/213 |
| 2007/0004361 | A1 | * | 1/2007 | Srinivasan et al. ......... 455/252.1 |

OTHER PUBLICATIONS

"Qualcomm Announces Single-Chip, RF Transceiver with Integrated GPS", Feb. 13, 2006, Navigadget.*
Qualcomm Anounces Signle Chip, RF Transceiver With Integrated GPS, Feb. 13, 2006, navigadget.com.*
Qualcomm Anounces Single Chip, RF Transceiver With Integrated GPS, Feb. 13, 2006, Nvigadget.com.*

* cited by examiner

*Primary Examiner* — Thomas H Tarcza
*Assistant Examiner* — Nga X Nguyen
(74) *Attorney, Agent, or Firm* — Trop, Pruner & Hu, P.C.

(57) ABSTRACT

An apparatus includes a radio receiver, a GPS receiver and a semiconductor package. The semiconductor package contains both the radio receiver and the GPS receiver.

19 Claims, 4 Drawing Sheets

APPARATUS HAVING INTEGRATED RADIO AND GPS RECEIVERS

BACKGROUND

The invention generally relates to an apparatus having an integrated receiver that receives both radio signals and GPS signals.

Radio signals refer to any signal in the AM, FM, shortwave, weatherband, or other frequency bands that is typically used to provide audio information and any signal in the VHF, UHF, L-band or other frequency bands that is typically used to provide video or television information. The radio signals are typically transmitted from broadcast towers located throughout the world. GPS signals refer to any signal related to the US global positioning system (GPS), the GLONASS system in Russia, the Galileo system in Europe, or any other satellite-based navigation system anywhere in the world typically transmitted within the L1, L2, L5, or other frequency bands.

Currently the US global positioning system (GPS) contains twenty-four satellites, which communicate signals that may be received by GPS receivers for such purposes as determining locations of the receivers. The GPS receiver is designed to acquire and process signals from one or more satellites with the goal to calculate the receiver's position. Each GPS satellite, in general, transmits two types of signals, one of which contains a pseudo-random noise code (typically called the "C/A code") that is typically used for commercial applications and the other of which contains an encrypted code called a "P code" that is typically used for military applications.

In a typical approach to determining its position, the GPS receiver receives and process the signals to calculate the position, velocity, and time of one or more of the satellites. In general, a GPS receiver may operate either in a standalone mode, an assisted mode called "Assisted-GPS" or A-GPS, or in a combination of modes, or in some other mode. In A-GPS mode, the system uses additional sources of information to augment the position calculations including but not limited to broadcast radio signals, cellular radio signals, mapping data, or other sources of information.

SUMMARY

In an embodiment of the invention, an apparatus includes a radio receiver, a GPS receiver and a semiconductor package. The semiconductor package contains both the radio receiver and the GPS receiver.

In another embodiment of the invention, a wireless device includes a semiconductor package and a subsystem coupled to the semiconductor package. The semiconductor package includes a radio receiver and a GPS receiver. The subsystem receives location information from the GPS receiver.

In another embodiment of the invention, a technique includes providing a radio receiver, a GPS receiver and a semiconductor package that contains both the radio receiver and the GPS receiver.

In yet another embodiment of the invention, an apparatus includes a broadcast video receiver, a GPS receiver and a semiconductor package. The semiconductor package contains both the broadcast video receiver and the GPS receiver.

Advantages and other features of the invention will become apparent from the following drawing, description and claims.

DETAILED DESCRIPTION

Figure 1:
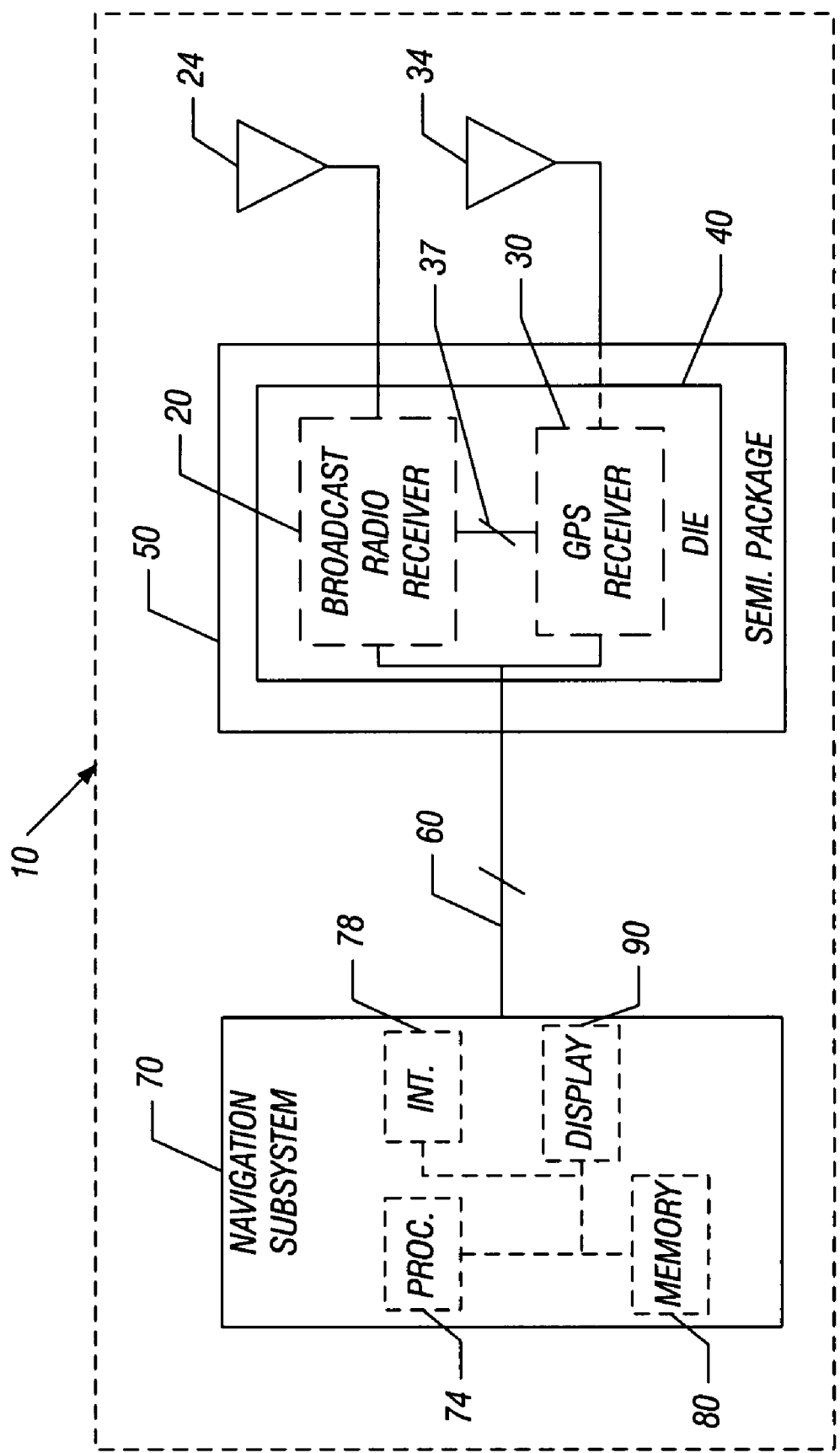
FIG. 1 is a schematic diagram of a personal navigation system according to an embodiment of the invention.

Referring to FIG. 1, in accordance with embodiments described herein, a semiconductor package 50 contains both a broadcast receiver 20 and a global positioning satellite (GPS) receiver 30. The semiconductor package 50 may be generally part of a wireless receiver system 10, which is coupled to a subsystem that uses location information that is generated by the GPS receiver 30. Depending on the particular embodiment of the invention, the system 10 may be, as examples, a single device; contain other technology blocks such as Bluetooth, USB, etc.; or it may be a handheld portable navigation device or cell phone coupled electrically to a peripheral.

As a more specific example, as depicted in FIG. 1, in some embodiments of the invention, the wireless receiver system 10 may be a navigation system (a personal navigation system as a non-limiting example), which includes a navigation subsystem 70 that is electrically coupled (as represented by communication lines 60) to the semiconductor package 50.

Depending on the particular embodiment of the invention, the navigation subsystem 70 may receive location information from the GPS receiver 30, as well as broadcast radio signals, such as frequency modulated (FM), amplitude modulated (AM) signals, radio data service (RDS), digital audio broadcast (DAB), weatherband, or other signals known to lie in the radio bands. The navigation subsystem 70 may use the location information, which is provided the GPS receiver 30 for certain applications that benefit from knowing the system's location and the information provided by the broadcast receiver 20 may be used for approximate location information, traffic information, entertainment, or other purposes.

For example, in accordance with some embodiments of the invention, the navigation subsystem 70 may use the location information for purposes of displaying nearby points of interest to a user of the wireless receiver system 10. In this regard, in some embodiments of the invention, the user may interact with the navigation subsystem 70 for purposes of requesting, for example, nearby restaurants or retail establishments. In response to this request, the navigation subsystem 70 may, based on its location, retrieve data from its memory 80 or another wirelessly or wired system, which indicates the desired points of interest that are near the wireless receiver system's location. These points of interest may be displayed by the navigation subsystem 70 on a display 90, for example.

As another example of the use of the location information provided by the GPS receiver 30, the navigation subsystem 70 may use the wireless receiver system's location for purposes of displaying the wireless receiver system's position on a map that is displayed on the display 90. The map information may be derived from data that is stored in the memory 80, as well as data that is communicated to the wireless receiver system 10 from another wired or wired-coupled system. As yet another example, the navigation subsystem 70 may calculate driving directions to a desired location (provided by the user) based on the wireless receiver system's location. As yet another example, the navigation subsystem 70 may communicate the wireless receiver system's location to another entity, such as in the case of an emergency where the location of the wireless receiver system 10 (i.e, the location of the user) may be sought for purposes of receiving emergency or other services.

In accordance with some embodiments of the invention, the navigation subsystem 70 may, via the broadcast radio receiver 20, receive traffic messaging information (TMC) that is communicated over FM/RDS for navigation. The TMC data may be interpreted by the processor 74 to re-route the user around traffic congestion in automotive applications.

As depicted in FIG. 1, in accordance with some embodiments of the invention, the broadcast radio receiver 20 and the GPS receiver 30 may be fabricated on the same semiconductor die 40. However, in accordance with other embodiments of the invention, the broadcast radio receiver 20 and the GPS receiver 30 may be fabricated on separate dies. Regardless, however, of the particular embodiment of the invention, the broadcast radio 20 and the GPS 30 receivers communicate via communication lines 37.

As also depicted in FIG. 1, the broadcast radio receiver 20 may be coupled to at least one antenna 24. The embodiments of the invention in which the broadcast receiver 20 contains both an AM receiver and a FM receiver, the broadcast radio receiver 20 may be coupled to two corresponding AM and FM antennae. Likewise, the GPS receiver 30 may be electrically coupled to a GPS antenna 34 in accordance with some embodiments of the invention.

The navigation subsystem 70 may take on various forms, depending on the particular embodiment of the invention. For purposes of example, in accordance with some embodiments of the invention, the navigation subsystem 70 may include a processor 74, which may be (as examples) a microcontroller unit or a digital signal processor (DSP). The processor 74 may be coupled to the memory 80, the display 90 and an interface 78, which communicates over the communication line 60 with the semiconductor package 50. Depending on the particular embodiment of the invention, the memory 80 may be a semiconductor memory, such as a dynamic random access memory (DRAM), an electrically erasable programmable read only memory (EEPROM), flash memory, or a memory based on a removable media card, as just a few examples.

In some embodiments of the invention, the navigation subsystem 70 may be formed at least in part on one or more semiconductor packages, which are separate from the semiconductor package 50. In this regard, the processor 74, memory 80 and interface 78 may be formed on a single die and/or a single semiconductor package in accordance with some embodiments of the invention. In other embodiments of the invention, the processor 74, memory 80 and interface 78 may be contained on separate media and/or separate semiconductor dies and/or processors. Thus, many variations are contemplated and are within the scope of the appended claims.

The GPS receiver 30 may be a GPS or an assisted GPS (A-GPS) receiver 30, depending on the particular embodiment of the invention. For the A-GPS arrangement, the GPS receiver 30 may receive assistance information from the broadcast radio receiver 20. In this regard, in accordance with some embodiments of the invention, the GPS receiver 30 may receive initial time and position estimates based on FM and/or AM signals that are received by the broadcast radio receiver 20. The signals may be received through another type of interface, which is coupled to the GPS receiver 30, in accordance with some embodiments of the invention. Additionally, in accordance with some embodiments of the invention, the GPS receiver 30 may offload position solution calculations to another system, such as an off site GPS service center. In this regard, the wireless receiver system 10 may include, for example, a transmitter interface for purposes of communicating range information, which is collected by the GPS receiver 30. Thus, as can be appreciated by one skilled in the art, many variations are possible, all of which are within the scope of the appended claims.

In any of these above example applications, or in any other application of the wireless receiver system 10, the broadcast radio receiver 20 may provide information to the navigation subsystem 70 or directly to the GPS receiver 30 that can be used to improve the performance of the navigation subsystem, or to provide entertainment for the end user. The information may be provided in either an assisted-GPS (A-GPS) mode or in a standalone GPS mode, or as a combination of modes or as a separate mode. For example, the station ID may be extracted directly from the broadcast radio signals and can be compared to a lookup table or other means to determine the approximate location of the wireless receiver system. The approximate location information may also be obtained indirectly from the broadcast radio signals by calculating a time-of-flight delay, or by other means. The approximate location information can speed up the location estimate calculated by the navigation subsystem 70, to improve location accuracy, to minimize power dissipation, or for other benefits. Other information that may be extracted from the broadcast radio signals includes an approximate time base, satellite ephemeris or almanac data, or any other information that can be used to improve the performance of the navigation subsystem 70 or for entertainment purposes. In any given device, the application of the broadcast radio receiver 20 for improving the performance of the navigation subsystem 70 or for entertainment purposes may be turned on and off, switched back and forth, or used simultaneously as needed.

Figure 2:
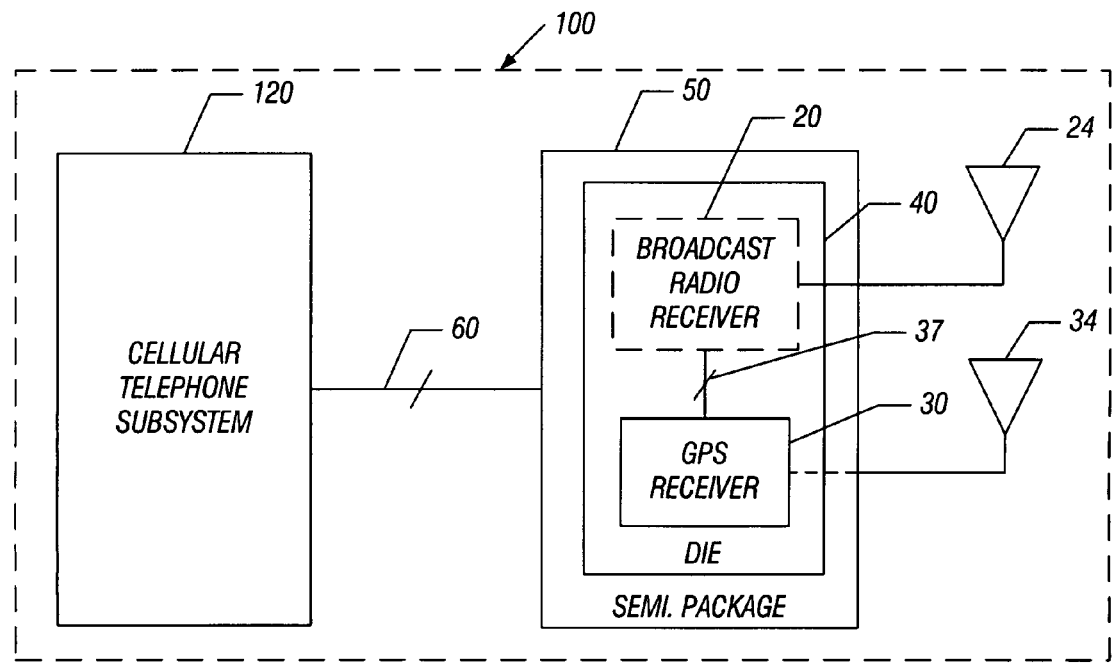
FIG. 2 is a schematic diagram of a cellular telephone system according to an embodiment of the invention.

Referring to FIG. 2, in accordance with other embodiments of the invention, the navigation subsystem 70 of FIG. 1 may be replaced by another system, which benefits from the location information that is provided by the GPS receiver 30. In this regard, FIG. 2 depicts a wireless receiver system 100, a cellular telephone system, which includes a cellular telephone subsystem 120. The cellular telephone subsystem 120 may use the location information from the GPS receiver 30 for various purposes, such as providing directions, indicating location of the wireless receiver system 100, providing nearby points of interest, etc. Additionally, the cellular telephone subsystem 120 may benefit from the AM, FM, DAB, RDS, DRM, Weatherband, or other types of signals that are provided by the broadcast radio receiver 20. In accordance with some embodiments of the invention, the wireless receiver system 100 may be a handheld portable unit, such as a personal digital assistant (PDA) or a handheld cellular telephone unit. Other embodiments are possible and are within the scope of the appended claims.

Figure 3:
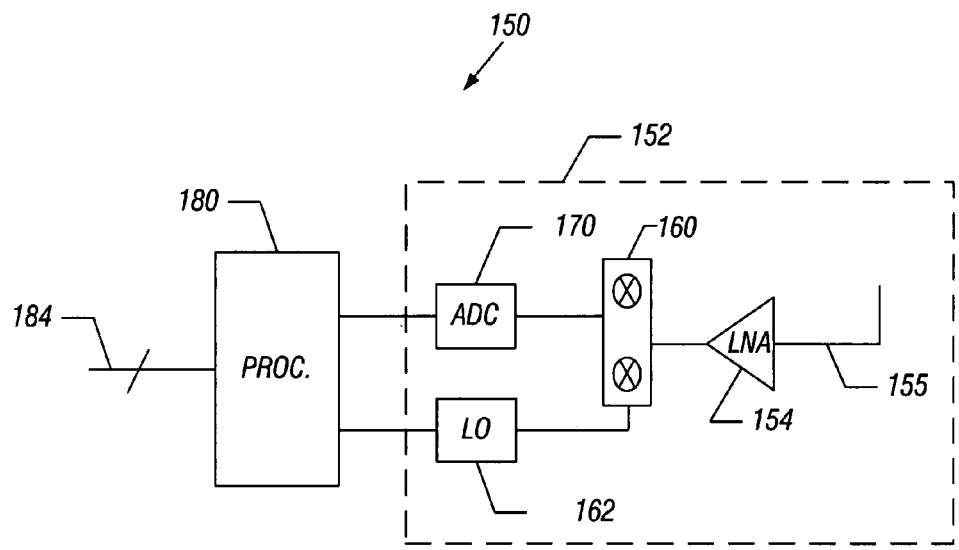
FIGS. 3, 4 and 5 are schematic diagrams of alternative architectures for the personal navigation and cellular telephone systems according to different embodiments of the invention.

Referring to FIG. 3, in accordance with some embodiments of the invention, the broadcast radio receiver 20 and the GPS receiver 30 may each have an architecture 150. The architecture 150 includes a front end 152, which is connected to a processor 180, which may be a microprocessor unit, digital signal processor, etc., depending on the particular embodiment of the invention. In general, the front end 152 includes an input terminal 155, which is connected to the antenna for the GPS 30 or broadcast radio 20 receiver. A low noise amplifier (LNA) 154 receives the incoming signal from the input terminal 155 and provides the corresponding signal to mixing circuitry 160. The mixing circuitry 160 also receives a local oscillator (LO) signal from a local oscillator 162 and responds to the receive signals, downconverts the signal from the LNA 154 in frequency to produce a downconverted signal, which is provided to an analog-to-digital converter (ADC) 170. The ADC 170 digitizes the received analog signal to provide a digital baseband signal that is provided to a processor 180. The processor 180 may be, as examples, a microcontroller, a unit, digital signal processor (DSP), etc., depending on the particular embodiment of the invention. The processor 180 may perform demodulation and filtering functions for the case where the architecture 150 is used for the broadcast radio receiver 20 and provide the corresponding digital audio content signal at output terminals 184. For the case where the architecture 150 is used for the GPS receiver 30, the processor 180 may generate location information indicating the location of the wireless receiver system and provide this information at its output terminal 184.

For the case where the architecture 150 is used for the broadcast radio receiver 20, the processor 180 may generate a data stream that contains an audio signal, TMC information station ID, or other information or a combination thereof to be used by the rest of the system as needed.

In some embodiments of the invention, the GPS 30 and broadcast radio 20 receivers may each have the architecture 150, in that each receiver 20, 30 generally contains a set of the components that are depicted in FIG. 3. However, components of the architecture 150 may be shared between the GPS 30 and the broadcast radio 20 receivers, in accordance with some embodiments of the invention. In this regard, the broadcast radio 20 and GPS 30 receivers may share components in a time-multiplex fashion, for example.

Figure 4:
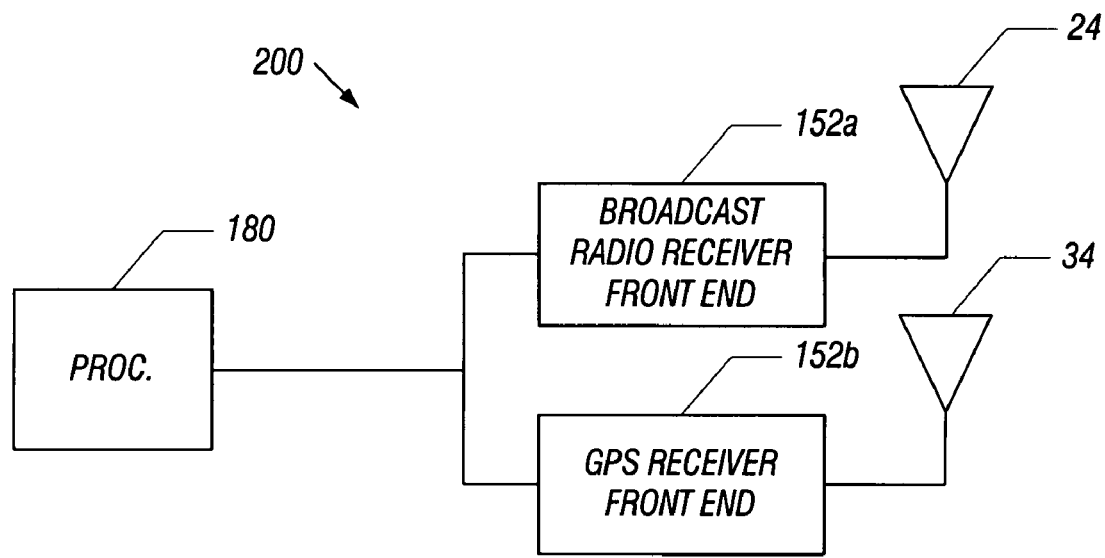

As a more specific example, FIG. 4 depicts an exemplary architecture 200 used to implement the broadcast radio 20 and GPS 30 receivers in accordance with some embodiments of the invention. The architecture 200 includes a broadcast radio receiver front end 152a, which has a design similar to the front end 152 that is depicted in FIG. 3. Similarly, for the GPS receiver 30, the architecture 200 contains a GPS receiver front end 152b. The front ends 152a and 152b share a common processor 180. Thus, the processor 180 may, for example, perform position solutions for the GPS receiver 30 during certain time segments, and during other time segments, may provide demodulation, frequency translation, filtering, etc. for the broadcast radio receiver 20.

As another example, the data from one receiver may be buffered, pre-processed, combined with data from the other receiver, and then processed together.

Figure 5:
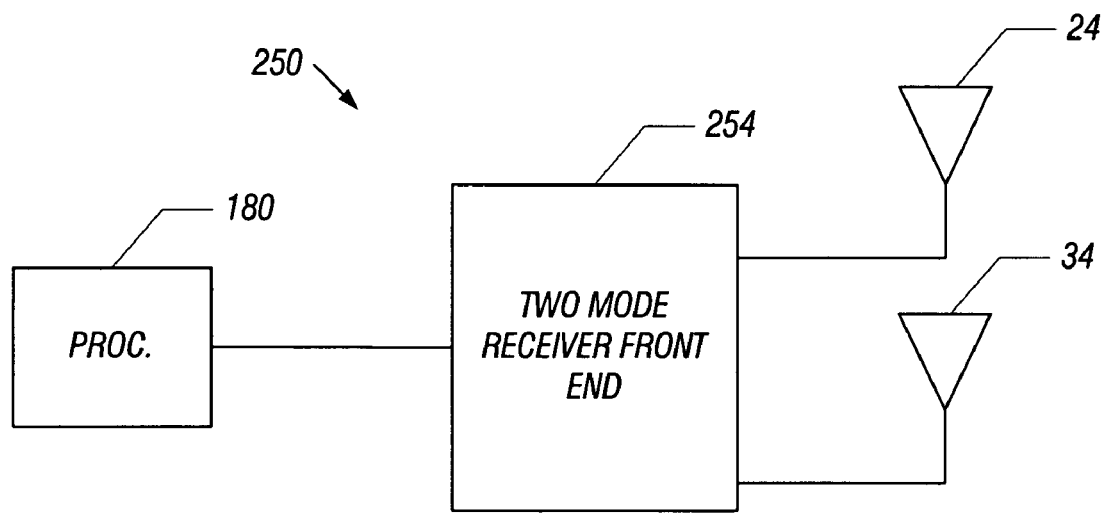

As another example, FIG. 5 depicts an exemplary architecture 250 in accordance with some embodiments of the invention. The architecture 250 includes a single, two mode front end 254 that is connected both to the radio 24 and GPS 34 antennae. Referring to FIG. 5 in conjunction with FIG. 3, in accordance with some embodiments of the invention, the two mode receiver front end 254 has in general a similar design to the front end 152. During a mode designated for the broadcast radio receiver 20, the local oscillator 162 generates the appropriate local oscillator signal so that the mixing circuitry 160 downconverts the received FM and/or AM signals to the appropriate frequency. Similarly, parameters of the ADC 170 may be adjusted for the broadcast radio receiver mode. During a mode for the GPS receiver 30, the local oscillator 162 generates a different set of local oscillator signals, which the mixing circuitry 160 uses to convert the received signals in the $L_1$, $L_2$, $L_5$ or other bands as needed for GPS data to the appropriate frequencies. Likewise, the ADC 170, during the GPS receiver mode, is correspondingly adjusted.

Figure 6:
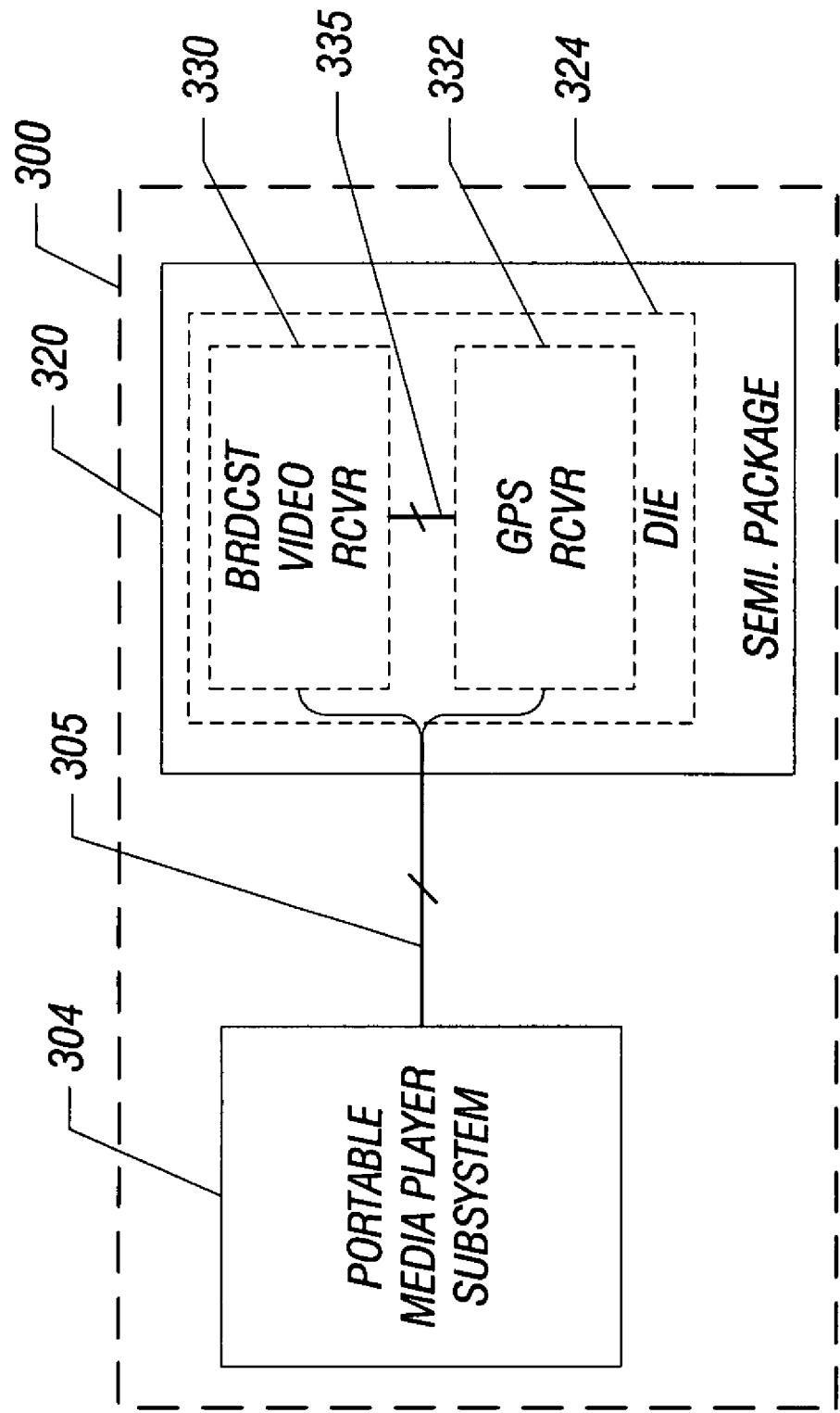
FIG. 6 is a schematic diagram of a portable media player system according to an embodiment of the invention.

In the architecture 250, a single processor 180 may be used in a time multiplexed fashion process the radio signal(s) and GPS signals from the two mode receiver front end 254, similar to the processor 180 of the architecture 200. Other variations are contemplated and are within the scope of the appended claims. Other embodiments are within the scope of the appended claims. For example, in other embodiments of the invention, the wireless receiver system that is disclosed herein may be incorporated into a portable media player. For example, in some embodiments of the invention, a portable media player system 300 (see FIG. 6) may include a broadcast video receiver 330 and a GPS receiver 332, both of which may be fabricated on the same semiconductor die 324 (for example). In this regard, the broadcast video receiver 330 and the GPS receiver 332 may communicate over communication lines 335 and may be part of the same semiconductor package 320. Depending on the particular embodiment of the invention, the broadcast video receiver 330 may either be an analog broadcast receiver (a receiver that receives an NTSC/PAL/SECAM format signal) or a digital broadcast receiver (a receiver that receives a DVB-T, ISDB-T or DMB format signal, as examples). The broadcast video 330 and GPS 332 receivers may communicate over communication lines 305 with a portable media player subsystem 304. Embodiments of the invention may also be used in automotive applications where the wireless receiver system is built directly into the automobile console or used as a separate device in automotive applications. Thus, many variations are possible and are within the scope of the appended claims.

While the present invention has been described with respect to a limited number of embodiments, those skilled in the art, having the benefit of this disclosure, will appreciate numerous modifications and variations therefrom. It is intended that the appended claims cover all such modifications and variations as fall within the true spirit and scope of this present invention.

What is claimed is:

1. An apparatus comprising:
   an FM band broadcast radio receiver;
   a GPS receiver;
   a semiconductor package containing both the radio receiver and the GPS receiver; and
   a die contained in the semiconductor package,
   wherein both the radio receiver and the GPS receiver are fabricated in the die, and the FM band broadcast radio receiver comprises a front end having a first mode in which the front end functions for the FM band broadcast radio receiver and a second mode in which the front end functions for the GPS receiver.

2. The apparatus of claim 1, wherein the first and second modes are time multiplexed.

3. The apparatus of claim 1, wherein the front end comprises a local oscillator to generate a first local oscillator signal during the first mode and generate a second different oscillator signal during the second mode.

4. A wireless device, comprising:
   a semiconductor package comprising an FM band broadcast radio receiver and a GPS receiver; and
   a subsystem coupled to the semiconductor package to receive location information from the GPS receiver,
   wherein the FM band broadcast radio receiver comprises a front end having a first mode in which the front end functions for the FM band broadcast radio receiver and a second mode in which the front end functions for the GPS receiver,
   wherein the semiconductor package comprises a die, and both the radio receiver and the GPS receiver are fabricated in the die.

5. The wireless device of claim 4, wherein the first and second modes are time multiplexed.

6. The wireless device of claim 4, wherein the front end comprises a local oscillator to generate a first local oscillator signal during the first mode and generate a second different oscillator signal during the second mode.

7. A method comprising:
providing an FM band broadcast radio receiver;
providing a GPS receiver;
packaging the radio receiver and the GPS receiver in the same semiconductor package; and
fabricating the radio receiver and the GPS receiver in the same die,
wherein the FM band broadcast radio receiver comprises a front end having a first mode in which the front end functions for the FM band broadcast radio receiver and a second mode in which the front end functions for the GPS receiver.

8. The method of claim 7, wherein the first and second modes are time multiplexed.

9. The method of claim 7, wherein the front end comprises a local oscillator to generate a first local oscillator signal during the first mode and generate a second different oscillator signal during the second mode.

10. The apparatus of claim 1, wherein the radio receiver is adapted to receive at least one of a broadcast radio signal or a service broadcast signal that is within the radio band.

11. The wireless device of claim 4, wherein the subsystem is part of at least one additional semiconductor package.

12. The wireless device of claim 4, wherein the subsystem comprises a navigation subsystem or a cellular telephone subsystem.

13. The wireless device of claim 4, wherein the GPS receiver is adapted to receive assistance information from the radio receiver.

14. The wireless device of claim 4, wherein the radio receiver comprises at least one of an FM broadcast radio receiver and an AM broadcast radio receiver.

15. The method of claim 7, further comprising:
adapting the radio receiver and the GPS receiver to communicate assistance information.

16. The method of claim 7, further comprising:
adapting the radio receiver to receive at least one of an FM, AM, weatherband, digital audio broadcast (DAB) and radio data service (RDS) signal.

17. The apparatus of claim 1, further comprising:
a processor to be shared between the GPS receiver and the FM band broadcast radio receiver.

18. The wireless device of claim 4, further comprising:
a processor to be shared between the GPS receiver and the FM band broadcast radio receiver.

19. The method of claim 7, further comprising:
a processor to be shared between the GPS receiver and the FM band broadcast radio receiver.

* * * * *